US012266320B2

(12) United States Patent
Ren et al.

(10) Patent No.: US 12,266,320 B2
(45) Date of Patent: Apr. 1, 2025

(54) GRAY SCALE COMPENSATION METHOD AND APPARATUS FOR DISPLAY PANEL

(71) Applicant: Kunshan New Flat Panel Display Technology Center Co., Ltd., Jiangsu (CN)

(72) Inventors: Chunhui Ren, Kunshan (CN); Xiaokang Zhou, Kunshan (CN); Jinquan Zhang, Kunshan (CN)

(73) Assignee: Kunshan New Flat Panel Display Technology Center Co., Ltd., Kunshan (CN)

( * ) Notice: Subject to any disclaimer, the term of this patent is extended or adjusted under 35 U.S.C. 154(b) by 0 days.

(21) Appl. No.: 18/342,076

(22) Filed: Jun. 27, 2023

(65) Prior Publication Data

US 2023/0343303 A1 Oct. 26, 2023

Related U.S. Application Data

(63) Continuation of application No. PCT/CN2021/137381, filed on Dec. 13, 2021.

(30) Foreign Application Priority Data

May 31, 2021 (CN) ......................... 202110602514.4

(51) Int. Cl.
*G09G 3/36* (2006.01)

(52) U.S. Cl.
CPC ... *G09G 3/3607* (2013.01); *G09G 2320/0626* (2013.01); *G09G 2320/0686* (2013.01)

(58) Field of Classification Search
None
See application file for complete search history.

(56) References Cited

U.S. PATENT DOCUMENTS

2017/0249890 A1* 8/2017 Yoo ...................... G09G 3/2077
2019/0305056 A1* 10/2019 Sonoda .................. H10K 59/12
(Continued)

FOREIGN PATENT DOCUMENTS

CN 109859668 A 6/2019
CN 110176209 A 8/2019
(Continued)

OTHER PUBLICATIONS

International Search Report issued on Feb. 23, 2022, in corresponding International Application No. PCT/CN2021/137381, 7 pages.
(Continued)

*Primary Examiner* — Benjamin C Lee
*Assistant Examiner* — Emily J Frank
(74) *Attorney, Agent, or Firm* — Maier & Maier, PLLC

(57) ABSTRACT

A gray scale compensation method for a display panel includes: dividing a display region of the display panel into a first display region, a second display region and a transition display region arranged between the first and second display regions; configuring a first compensation algorithm for the first display region to obtain a first compensation gray scale of the first display region, configuring, for the second display region, a second compensation algorithm different from the first compensation algorithm to obtain a second compensation gray scale of the second display region, and configuring, for the transition display region, a third compensation algorithm different from the first and second compensation algorithms to obtain a third compensation gray scale of the transition display region; and configuring the display panel to display an image according to the first compensation gray scale, the second compensation gray scale and the third compensation gray scale.

9 Claims, 4 Drawing Sheets

(56) References Cited

U.S. PATENT DOCUMENTS

| | | | | |
|---|---|---|---|---|
| 2020/0013326 | A1* | 1/2020 | Zheng | G09G 3/20 |
| 2020/0234634 | A1* | 7/2020 | Li | G09G 3/3208 |
| 2021/0074229 | A1* | 3/2021 | Hsu | G09G 3/3607 |
| 2021/0287626 | A1* | 9/2021 | Liu | G09G 3/36 |
| 2021/0383736 | A1* | 12/2021 | Hong | G09G 3/3233 |
| 2024/0112616 | A1* | 4/2024 | Han | G09G 3/3225 |

FOREIGN PATENT DOCUMENTS

| | | | |
|---|---|---|---|
| CN | 110444157 | A | 11/2019 |
| CN | 110580874 | A | 12/2019 |
| CN | 110648640 | A | 1/2020 |
| CN | 110808006 | A | 2/2020 |
| CN | 111009207 | A | 4/2020 |
| CN | 111816112 | A | 10/2020 |
| CN | 111833794 | A | 10/2020 |
| CN | 112530346 | A | 3/2021 |
| CN | 112562585 | A | 3/2021 |
| CN | 112614461 | A | 4/2021 |
| CN | 113284458 | A | 8/2021 |

OTHER PUBLICATIONS

Office Action issued on Mar. 10, 2022, in corresponding Chinese Application No. 202110602514.4, 13 pages.

* cited by examiner

GRAY SCALE COMPENSATION METHOD AND APPARATUS FOR DISPLAY PANEL

CROSS-REFERENCE TO RELATED APPLICATIONS

The present application is a continuation of International Application No. PCT/CN2021/137381, filed on Dec. 13, 2021, which claims the benefit of priority to Chinese Patent Application No. 202110602514.4 filed on May 31, 2021, entitled "GRAY SCALE COMPENSATION METHOD FOR DISPLAY PANEL", both of which are incorporated herein by reference in their entireties.

TECHNICAL FIELD

The present application relates to the field of display technology, and particularly, to a gray scale compensation method and apparatus for a display panel.

BACKGROUND

An organic light-emitting diode (OLED) display panel has a problem on evenness of display brightness, that is, the OLED display panel often suffers from uneven display brightness (mura). A method for compensating the uneven display brightness may include an internal compensation method and an external compensation method. The external compensation method refers to a method of sensing electrical or optical characteristics of pixels by an external driving circuit or device, and then performing compensation. Since the optical extraction method used in the external compensation has advantages of simplicity and flexibility, the external compensation method is widely used at present.

With the existing compensation methods for the display panel, there is a phenomenon of color deviation in some areas of the compensated display panel, thereby causing the poor compensation effect.

SUMMARY

The present application provides a gray scale compensation method and apparatus for a display panel, so as to improve the display effect of the compensated display panel.

In a first aspect, an embodiment of the present application provides a gray scale compensation method for a display panel. The method includes: dividing a display region of the display panel into a first display region, a second display region and a transition display region arranged between the first display region and the second display region; configuring a first compensation algorithm for the first display region, so that a first compensation gray scale of the first display region is obtained according to the first compensation algorithm, configuring, for the second display region, a second compensation algorithm different from the first compensation algorithm, so that a second compensation gray scale of the second display region is obtained according to the second compensation algorithm, and configuring, for the transition display region, a third compensation algorithm different from the first compensation algorithm and the second compensation algorithm, so that a third compensation gray scale of the transition display region is obtained according to the third compensation algorithm; and configuring the display panel to display an image according to the first compensation gray scale, the second compensation gray scale and the third compensation gray scale.

In a second aspect, an embodiment of the present application provides a gray scale compensation apparatus for performing gray scale compensation for a display panel. The display panel includes a first display region, a second display region and a transition display region arranged between the first display region and the second display region. The gray scale compensation apparatus for the display panel includes: a first compensation algorithm unit, configured to configure a first compensation algorithm for the first display region, so that a first compensation gray scale of the first display region is obtained according to the first compensation algorithm; a second compensation algorithm unit, configured to configure a second compensation algorithm for the second display region, so that a second compensation gray scale of the second display region is obtained according to the second compensation algorithm; a third compensation algorithm unit, configured to configure a third compensation algorithm for the transition display region, so that a third compensation gray scale of the transition display region is obtained according to the third compensation algorithm; a compensation driving unit, configured to configure the display panel to display an image according to the first compensation gray scale, the second compensation gray scale and the third compensation gray scale.

In the gray scale compensation method and apparatus for the display panel according to the embodiments of the present application, the first compensation algorithm is configured for the first display region and the second compensation algorithm is configured for the second display region, so that different display regions have independent compensation algorithms and compensation parameters, thereby avoiding a phenomenon of color deviation in some areas of the display panel caused by using a same compensation algorithm for the whole display panel. In the embodiments of the present application, the transition display region is arranged between the first display region and the second display region of the display panel, and the third compensation algorithm is configured for the transition display region, so that a compensation difference between the first display region and the second display region is reduced, and there is a transition region between the first display region and the second display region under a compensated display effect, thereby improving the display effect of the compensated display panel.

DETAILED DESCRIPTION

Embodiments of the present application provide a gray scale compensation method for performing gray scale compensation for a display panel. The display panel may be an organic light-emitting diode (OLED) display panel, and in some embodiments, the display panel may also be a liquid crystal display panel (LCD) and a display panel using Micro-LED and light-emitting diode (LED) devices.

In order to better understand the present application, a gray scale compensation method for a display panel according to the embodiments of the present application will be described in detail with reference to FIG. 1 to FIG. 5.

Figure 1:
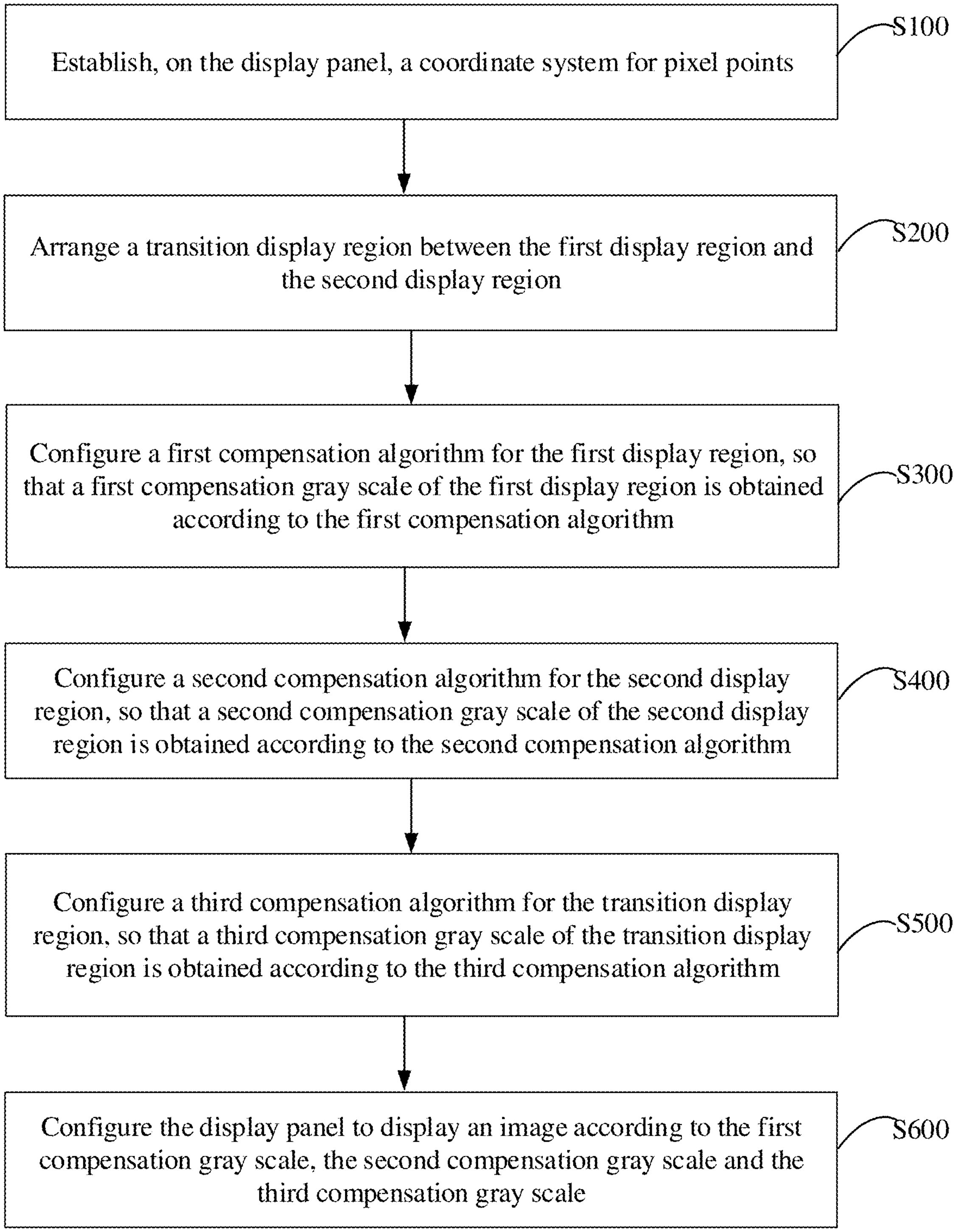
FIG. 1 is a flowchart of a gray scale compensation method for a display panel according to an embodiment of the present application.

FIG. 1 shows a flowchart of a gray scale compensation method for a display panel according to an embodiment of the present application, and the gray scale compensation method for the display panel according to the embodiment includes the steps below:

- establishing, on the display panel, a coordinate system for pixel points, wherein the display panel includes a plurality of sub-pixels arranged in a display region, each sub-pixel can display one color, and the plurality of sub-pixels include, for example, red sub-pixels, green sub-pixels and blue sub-pixels, and the pixel points refer to the sub-pixels;
- dividing a display region of the display panel into a first display region, a second display region and a transition display region arranged between the first display region and the second display region;
- configuring a first compensation algorithm for the first display region, so that a first compensation gray scale of the first display region is obtained according to the first compensation algorithm;
- configuring, for the second display region, a second compensation algorithm different from the first compensation algorithm, so that a second compensation gray scale of the second display region is obtained according to the second compensation algorithm;
- configuring, for the transition display region, a third compensation algorithm different from the first compensation algorithm and the second compensation algorithm, so that a third compensation gray scale of the transition display region is obtained according to the third compensation algorithm; and
- configuring the display panel to display an image according to the first compensation gray scale, the second compensation gray scale and the third compensation gray scale.

In the gray scale compensation method for the display panel according to the embodiments of the present application, the first compensation algorithm is configured for the first display region and the second compensation algorithm is configured for the second display region, so that different display regions have independent compensation algorithms and compensation parameters, thereby avoiding a phenomenon of color deviation in some areas of the display panel caused by using a same compensation algorithm for the whole display panel. In the embodiments of the present application, the transition display region is arranged between the first display region and the second display region of the display panel, and the third compensation algorithm is configured for the transition display region, so that a compensation difference between the first display region and the second display region is reduced, and there is a transition region between the first display region and the second display region under a compensated display effect, thereby improving the display effect of the compensated display panel.

Figure 2:
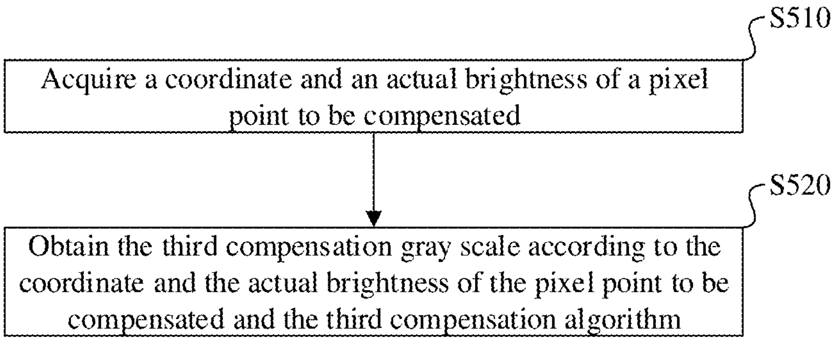
FIG. 2 is a flowchart of steps for configuring, in a gray scale compensation method for a display panel according to an embodiment of the present application, a third compensation algorithm for a transition display region.

FIG. 2 shows a flowchart of steps for configuring, in a gray scale compensation method for a display panel according to an embodiment of the present application, a third compensation algorithm for the transition display region. In the gray scale compensation method, the first compensation algorithm, the second compensation algorithm and the third compensation algorithm different from each other are configured for the first display region, the second display region and the transition display region, respectively, so that the first compensation gray scale of the first display region is obtained according to the first compensation algorithm, the second compensation gray scale of the second display region is obtained according to the second compensation algorithm, and the third compensation gray scale of the transition display region is obtained according to the third compensation algorithm. The steps for configuring the third compensation algorithm for the transition display region include:

- acquiring a coordinate and an actual brightness of a pixel point to be compensated, and
- obtaining the third compensation gray scale according to the coordinate and the actual brightness of the pixel point to be compensated and the third compensation algorithm.

Figure 3:
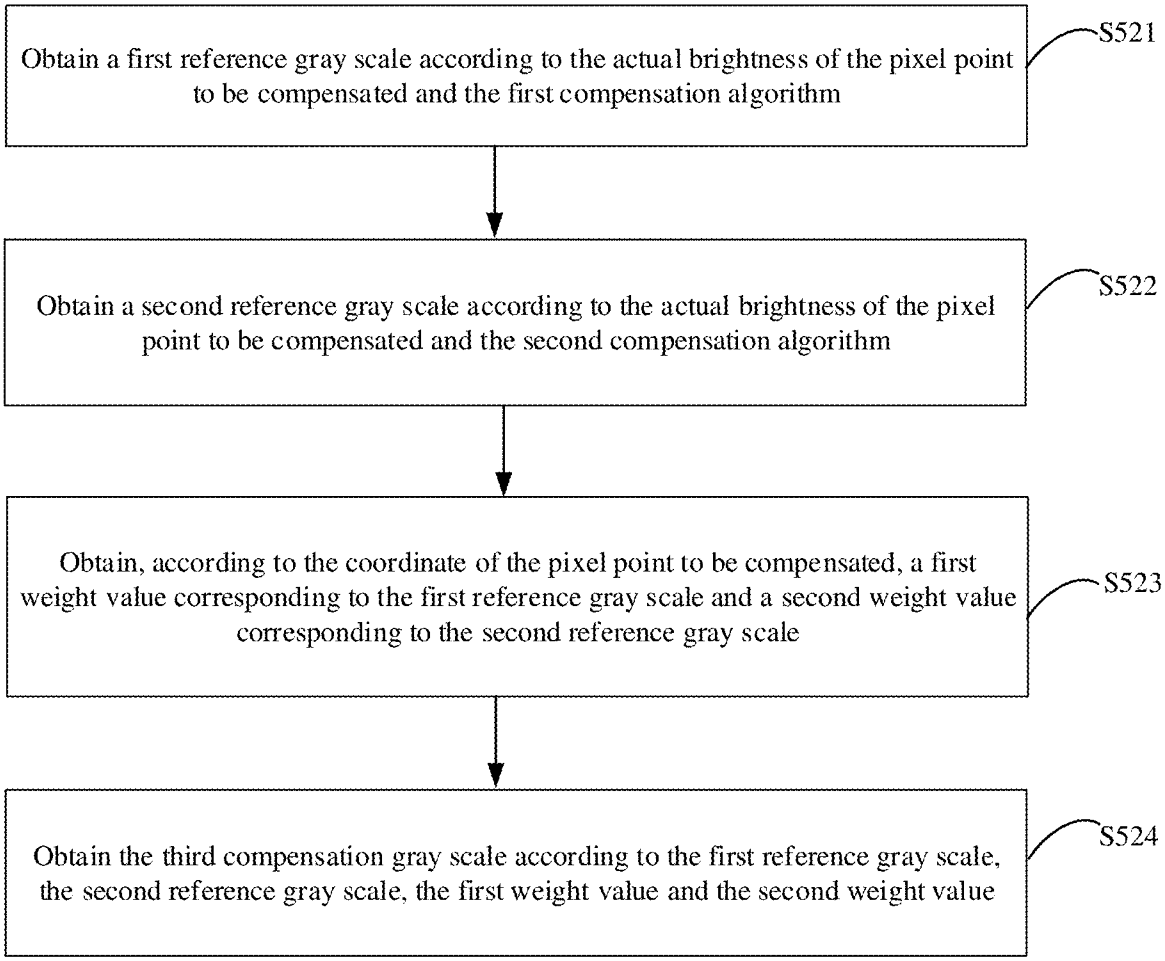
FIG. 3 is a flowchart of steps for obtaining, in a gray scale compensation method for a display panel according to an embodiment of the present application, a third compensation gray scale according to a coordinate and an actual brightness of a pixel point to be compensated and a third compensation algorithm.

FIG. 3 is a flowchart of steps for obtaining, in a gray scale compensation method for a display panel according to an embodiment of the present application, a third compensation gray scale according to the coordinate and the actual brightness of the pixel points to be compensated and the third compensation algorithm.

The steps for obtaining the third compensation gray scale according to the coordinate and the actual brightness of the pixel points to be compensated and the third compensation algorithm include:

- obtaining a first reference gray scale according to the actual brightness of the pixel point to be compensated and the first compensation algorithm;
- obtaining a second reference gray scale according to the actual brightness of the pixel point to be compensated and the second compensation algorithm;
- obtaining, according to the coordinate of the pixel point to be compensated, a first weight value corresponding to the first reference gray scale and a second weight value corresponding to the second reference gray scale; and
- obtaining the third compensation gray scale according to the first reference gray scale, the second reference gray scale, the first weight value and the second weight value.

Figure 4:
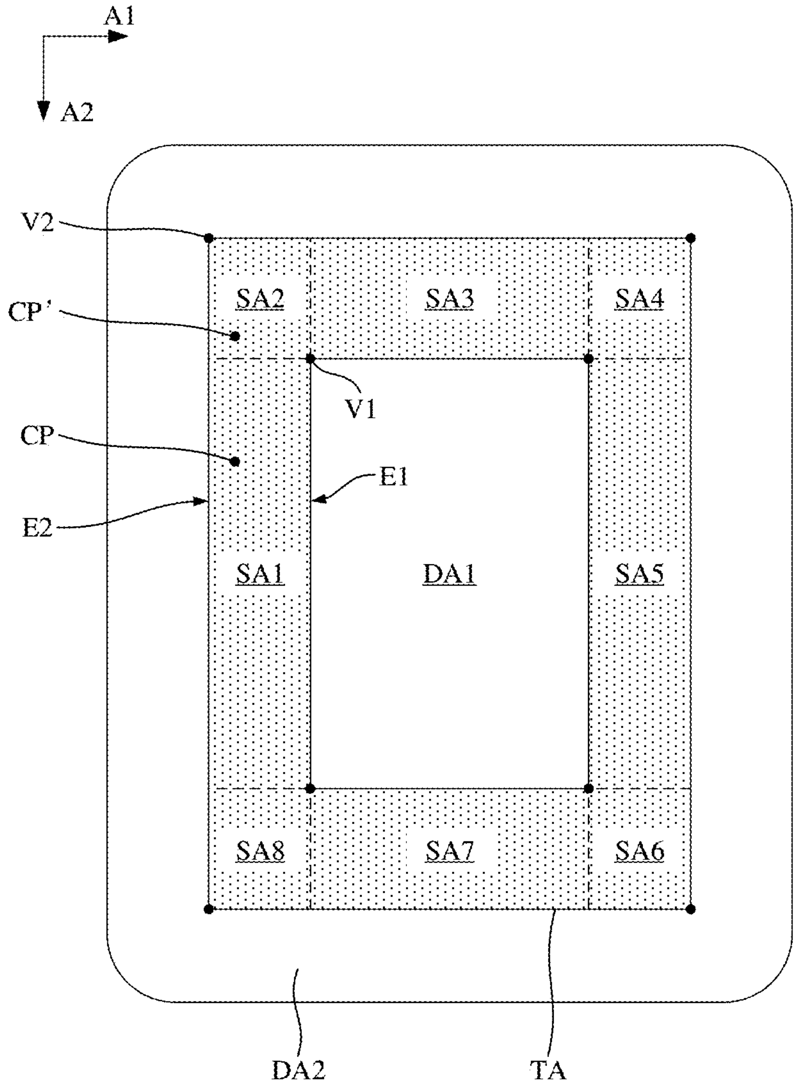
FIG. 4 is a schematic structural view of a display panel to be compensated by a gray scale compensation method for the display panel according to an embodiment of the present application.

With reference to FIG. 4, a first display region DA1 is a rectangular shape, a transition display region TA is a rectangular ring shape and surrounds an outer periphery of the first display region DA1, and a second display region DA2 surrounds an outer periphery of the transition display region TA. The first display region DA1 is located in a central region of the display panel, and the second display region DA2 is located in a peripheral region of the display panel. The central region and the peripheral region of the display panel are compensated separately to ensure that more suitable compensation algorithms may be configured for the central region and the peripheral region respectively, thereby mitigating a phenomenon of color deviation in the peripheral region of the compensated display panel to a certain extent.

The coordinate system includes a first coordinate axis A1 and a second coordinate axis A2 perpendicular to each other. The first coordinate axis A1 is parallel to one pair of sides of the first display region DA1, and the second coordinate axis A2 is parallel to the other pair of sides of the first display region DA1. In this embodiment, a plurality of pixel points are arranged in an array in the display panel, the first coordinate axis A1 is, for example, parallel to a row direction of an arrangement structure of the pixel points, and the second coordinate axis A2 is, for example, parallel to a column direction of an arrangement structure of the pixel points. Under this condition, a coordinate of a pixel point along the first coordinate axis A1 represents which column the pixel point is located in the arrangement structure of the pixel points, and a coordinate of the pixel point along the second coordinate axis A2 represents which row the pixel point is located in the arrangement structure of the pixel points.

The transition display region TA is the rectangular ring shape and includes a rectangular inner boundary adjacent to the first display region DA1 and a rectangular outer boundary adjacent to the second display region DA2. Optionally, coordinates of four vertices of the inner boundary of the transition display region TA are set as (m1, n1), (m1, n2), (m2, n1) and (m2, n2), respectively, and m1 and m2 are coordinate values of vertices or pixel points along the second coordinate axis A2, that is, m1 and m2 are numbers of rows where vertices or pixel points are located; and n1 and n2 are coordinate values of vertices or pixel points along the first coordinate axis A1, that is, n1 and n2 are numbers of columns where vertices or pixel points are located. In this embodiment, coordinates of four vertices of the outer boundary of the transition display region TA are set as (x1, y1), (x1, y2), (x2, y1) and (x2, y2), respectively, and x1 and x2 are coordinate values of vertices or pixel points along the second coordinate axis A2, that is, x1 and x2 are numbers of rows where vertices or pixel points are located; and y1 and y2 are coordinate values of vertices or pixel points along the first coordinate axis A1, that is, y1 and y2 are numbers of columns where vertices or pixel points are located.

The transition display region TA includes a plurality of sub-transition regions, and each sub-transition region is a rectangular shape. An inner boundary of the second display region DA2 intersects with extended lines of a plurality of sides of the first display region DA1, and thus the transition display region TA is divided to form the plurality of sub-transition regions.

The first weight value is negatively correlated with a distance between the pixel point to be compensated and the first display region, and the second weight value is negatively correlated with a distance between the pixel point to be compensated and the second display region. Accordingly, the closer a pixel point to be compensated in the transition display region is to the first display region, the closer a compensation effect is to the compensation effect of the pixel point in the first display region, and the closer a pixel point to be compensated in the transition display region is to the second display region, the closer a compensation effect is to the compensation effect of the pixel point in the second display region, so that the compensation effect of the display panel transitions from the first display region to the second display region in a weighted manner, thereby improving the display effect of the compensated display panel.

With further reference to FIG. 4, the plurality of sub-transition regions include a first sub-transition region SA1 located between the first display region DA1 and the second display region DA2 along a direction parallel to the first coordinate axis A1. Or, the first display region DA1, the first sub-transition region SA1 and the second display region DA2 are arranged along a first direction. The first sub-transition region SA1 includes opposite first side E1 and second side E2, the side E1 coincides with one of sides of the first display region DA1, and the second side E2 coincides with one of sides of the second display region DA2. In this embodiment, an example is given in which the first sub-transition region SA1 is a sub-transition region located on the left side of the first display region DA1, a coordinate value of the first side E1 of the first sub-transition region SA1 on the first coordinate axis A1 is n1, and a coordinate value of the second side E2 of the first sub-transition region SA1 on the first coordinate axis A1 is y1.

In the first sub-transition region SA1, a coordinate of a pixel point CP to be compensated is set as (a1, b1). In the first sub-transition region SA1, the step S523 of obtaining, according to the coordinate of the pixel point to be compensated, the first weight value corresponding to the first reference gray scale and the second weight value corresponding to the second reference gray scale includes the steps below:

obtaining the first weight value according to the formula below:

$$k1=(b1-y1)/(n1-y1),$$

where k1 is the first weight value; b1 is a coordinate value of the pixel point to be compensated on the first coordinate axis A1; n1 is a coordinate value of the first side E1 on the first coordinate axis A1; y1 is a coordinate value of the second side E2 on the first coordinate axis A1, and obtaining the second weight value according to the formula below:

$$k2=1-k1,$$

where k2 is the second weight value.

Here, the first weight value k1 and the second weight value k2 of the pixel point to be compensated in the first sub-transition region SA1 are obtained.

The plurality of sub-transition regions include a second sub-transition region SA2 including opposite first vertex V1 and second vertex V2, the first vertex V1 coincides with one of vertices of the first display region DA1, and the second vertex V2 is one of the vertices of the transition display region TA. In this embodiment, an example is given in which the second sub-transition region SA2 is a sub-transition region located at the upper left corner of the first display region DA1, a coordinate of the first vertex V1 of the second sub-transition region SA2 is (m1, n1), and a coordinate of the second vertex V2 of the second sub-transition region SA2 is (x1, y1).

In the second sub-transition region SA2, a coordinate of a pixel point CP' to be compensated is set as (a2, b2). In the second sub-transition region SA2, the step S523 of obtaining, according to the coordinate of the pixel point to be compensated, the first weight value corresponding to the first reference gray scale and the second weight value corresponding to the second reference gray scale includes the steps below:

obtaining the first weight value according to the formula below:

$$k1=\sqrt{((b2-y1)/(n1-y1))^2+((a2-x1)/(m1-x1))^2},$$

correcting k1 to be equal to 1 under a condition that k1>1, where k1 is the first weight value; b2 is a coordinate value of the pixel point to be compensated on the first coordinate axis A1; a2 is a coordinate value of the pixel point to be compensated on the second coordinate axis A2; n1 is a coordinate value of the first vertex V1 on the first coordinate axis A1; m1 is a coordinate value of the first vertex V1 on the second coordinate axis A2; y1 is a coordinate value of the second vertex V2 on the first coordinate axis A1; x1 is a coordinate value of the second vertex V2 on the second coordinate axis A2, and obtaining the second weight value according to the formula below:

$$k2=1-k1,$$

where k2 is the second weight value.

Here, the first weight value k1 and the second weight value k2 of the pixel point to be compensated in the second sub-transition region SA2 are obtained.

In this embodiment, the plurality of sub-transition regions further include a third sub-transition region SA3, a fourth sub-transition region SA4, a fifth sub-transition region SA5, a sixth sub-transition region SA6, a seventh sub-transition region SA7 and an eighth sub-transition region SA8 arranged in sequence with the first sub-transition region SA1 and the second sub-transition region SA2 along a clockwise direction. In the third sub-transition region SA3, the fifth sub-transition region SA5 and the seventh sub-transition region SA7, a manner of obtaining a first weight value corresponding to the first reference gray scale and a second weight value corresponding to the second reference gray scale according to the coordinate of the pixel point to be compensated is similar to the manner in the first sub-transition region SA1. In the fourth sub-transition region SA4, the sixth sub-transition region SA6 and the eighth sub-transition region SA8, a manner of obtaining a first weight value corresponding to the first reference gray scale and a second weight value corresponding to the second reference gray scale according to the coordinate of the pixel point to be compensated is similar to the manner in the second sub-transition region SA2.

In some embodiments, the step S524 of obtaining the third compensation gray scale according to the first reference gray scale, the second reference gray scale, the first weight value and the second weight value includes obtaining the third compensation gray scale according to the formula below:

$$Nc=N_{x1}\times k1+N_{x2}\times k2,$$

where Nc is the third compensation gray scale; $N_{x1}$ is the first reference gray scale; $N_{x2}$ is the second reference gray scale; k1 is the first weight value; k2 is the second weight value.

In some embodiments, the step S521 of obtaining the first reference gray scale according to the actual brightness of the pixel to be compensated and the first compensation algorithm includes obtaining the first reference gray scale according to the formula below:

$$N_{x1}=N1\times(L_{aver1}/\text{Ln})^{1/Gamma1},$$

where $N_{x1}$ is the first reference gray scale; N1 is, under the first compensation algorithm, a pre-compensation displaying gray scale for the pixel to be compensated; $L_{aver1}$ is, under the first compensation algorithm, a target compensation brightness of the pixel point to be compensated; Ln is the actual brightness of the pixel point to be compensated; Gamma1 is a gray scale coefficient (Gamma value) under the first compensation algorithm.

Under a condition that the configured first compensation algorithm has been determined, the gray scale coefficient Gamma1 is a preset value that is already known. The pre-compensation displaying gray scale N1 is a preset value within a gray scale range that the display panel can display, for example, the display panel can display 256 gray scales, and under a condition that a brightness under a gray scale 16 of the pixel point to be compensated is required to be compensated, the pre-compensation displaying gray scale N1 is 16. After the pre-compensation displaying gray scale N1 is determined, the actual brightness Ln of the pixel point to be compensated may be obtained by an optical component. The target compensation brightness $L_{aver1}$ is a target brightness of the pixel point to be compensated which is expected to be displayed under the pre-compensation displaying gray scale N1, and in this embodiment, the target compensation brightness $L_{aver1}$ is an average brightness of pixel points of the whole display panel under the pre-compensation displaying gray scale N1, or the target compensation brightness $L_{aver1}$ is, under the pre-compensation displaying gray scale N1, an average brightness of several pixel points adjacent to the pixel point to be compensated.

For example, under a condition that the pre-compensation displaying gray scale N1 is determined to be 16, the target compensation brightness $L_{aver1}$ is the average brightness of the several pixel points adjacent to the pixel point to be compensated when the display panel displays at a gray scale 16. Accordingly, under a condition that the configured first compensation algorithm has been determined, the first reference gray scale $N_{x1}$ may be obtained according to the selected pre-compensation displaying gray scale N1 and the detected actual brightness Ln of the pixel point to be compensated. Under a condition that the actual brightness Ln of the pixel point to be compensated is lower than the target compensation brightness $L_{aver1}$ a first reference gray scale $N_{x1}$ with a higher value than the pre-compensation displaying gray scale N1 may be calculated so as to compensate the brightness of the pixel point to be compensated to be higher. Under a condition that the actual brightness Ln of the pixel point to be compensated is higher than the target compensation brightness $L_{aver1}$, a first reference gray scale $N_{x1}$ with a lower value than the pre-compensation displaying gray scale N1 may be calculated so as to compensate the brightness of the pixel point to be compensated to be lower. The above example illustrates the calculation method of the first reference gray scale $N_{x1}$ under a condition that the pre-compensation displaying gray scale N1 is 16. Similarly, under a condition that the display panel may display 256 gray scales, a first reference gray scale $N_{x1}$ may be calculated for any pre-compensation displaying gray scale N1 in a range of 0 to 255.

In some embodiments, the step S522 of obtaining the first reference gray scale according to the coordinate and the actual brightness of the pixel to be compensated and the first compensation algorithm includes obtaining the first reference gray scale according to the formula below:

$$N_{x2}=N2\times(L_{aver2}/\text{Ln})^{1/Gamma2},$$

where $N_{x2}$ is the second reference gray scale; N2 is, under the second compensation algorithm, a pre-compensation displaying gray scale for the pixel point to be compensated; $L_{aver2}$ is, under the second compensation algorithm, a target compensation brightness of the pixel point to be compensated; Ln is the actual brightness of the pixel point to be compensated; Gamma2 is a gray scale coefficient under the second compensation algorithm. Under a condition that the configured second compensation algorithm has been determined, the gray scale coefficient Gamma2 is a preset value that is already known. The pre-compensation displaying gray scale N2 is a preset value within a gray scale range that the display panel can display, for example, the display panel can display 256 gray scales, and under a condition that a brightness under a gray scale 16 of the pixel point to be compensated is required to be compensated, the pre-compensation displaying gray scale N2 is 16. After the pre-compensation displaying gray scale N2 is determined, the actual brightness Ln of the pixel point to be compensated may be obtained by an optical component. The target compensation brightness $L_{aver2}$ is a target brightness of the pixel point to be compensated which is expected to be displayed under the pre-compensation displaying gray scale N2, and in this embodiment, the target compensation brightness $L_{aver2}$ is an average brightness of pixel points of the whole display panel under the pre-compensation displaying gray scale N2, or the target compensation brightness $L_{aver2}$ is, under the pre-compensation displaying gray scale N2, an average brightness of several pixel points adjacent to the pixel point to be compensated. For example, under a condition that the pre-compensation displaying gray scale N2 is determined to be 16, the target compensation brightness $L_{aver2}$ is the average brightness of the several pixel points adjacent to the pixel point to be compensated when the display panel displays at a gray scale 16. Accordingly, under a condition that the configured second compensation algorithm has been determined, the second reference gray scale $N_{x2}$ may be obtained according to the selected pre-compensation displaying gray scale N2 and the detected actual brightness Ln of the pixel point to be compensated. Under a condition that the actual brightness Ln of the pixel point to be compensated is lower than the target compensation brightness $L_{aver2}$, a second reference gray scale $N_{x2}$ with a higher value than the pre-compensation displaying gray scale N2 may be calculated so as to compensate the brightness of the pixel point to be compensated to be higher. Under a condition that the actual brightness Ln of the pixel point to be compensated is higher than the target compensation brightness $L_{aver2}$, a second reference gray scale $N_{x2}$ with a lower value than the pre-compensation displaying gray scale N2 may be calculated so as to compensate the brightness of the pixel point to be compensated to be lower. The above example illustrates the calculation method of the second reference gray scale $N_{x2}$ under a condition that the pre-compensation displaying gray scale N2 is 16. Similarly, under a condition that the display panel may display 256 gray scales, a second reference gray scale $N_{x2}$ may be calculated for any pre-compensation displaying gray scale N2 in a range of 0 to 255.

In the above embodiment, the first display region DA1 is located in a central region of the display panel, and the second display region DA2 is located in a peripheral region of the display panel. The first display region DA1 is compensated by an independent first compensation algorithm, and the second display region DA2 is compensated by an independent second compensation algorithm. The central region and the peripheral region of the display panel are compensated separately, so as to ensure that more suitable compensation algorithms may be configured for the central region and the peripheral region respectively, thereby avoiding the phenomenon of color deviation in some areas of the display panel caused by using the same compensation algorithm for the whole display panel. The transition display region TA is arranged between the first display region DA1 and the second display region DA2, so that the compensation effect of the display panel transitions from the first display region to the second display region in a weighted manner, so as to achieve gradual change of compensation weight and improve the display effect of the compensated display panel.

In the above embodiment, the third compensation gray scale Nc is obtained by the formula $Nc=N_{x1}\times k1+N_{x2}\times k2$ according to the first weight value k1 and the second weight value k2. However, the manners for obtaining the third compensation gray scale Nc are not limited to this, and may be other weighted manners.

For example, in one alternative embodiment, N1=N2 and Gamma1=Gamma2, optionally, obtaining the third compensation gray scale according to the first reference gray scale, the second reference gray scale, the first weight value and the second weight value includes obtaining the third compensation gray scale according to the formula below:

$$Nc=N1\times((L_{aver1}\times k1+L_{aver2}\times k2)/\mathrm{Ln})^{1/Gamma1},$$

where Nc is the third compensation gray scale.

For example, in another alternative embodiment, N1=N2 and $L_{aver1}$–$L_{aver2}$, optionally, obtaining the third compensation gray scale according to the first reference gray scale, the second reference gray scale, the first weight value and the second weight value includes obtaining the third compensation gray scale according to the formula below:

$$Nc=N1\times(L_{aver1}/\mathrm{Ln})^{1/(Gamma1\times k1+Gamma2\times k2)},$$

where Nc is the third compensation gray scale.

In some above alternative embodiments, weighted transition of the compensation effect of the display panel from the first display region DA1 to the second display region DA2 may further be achieved by setting different weighting manners, thereby improving the display effect of the compensated display panel.

Figure 5:
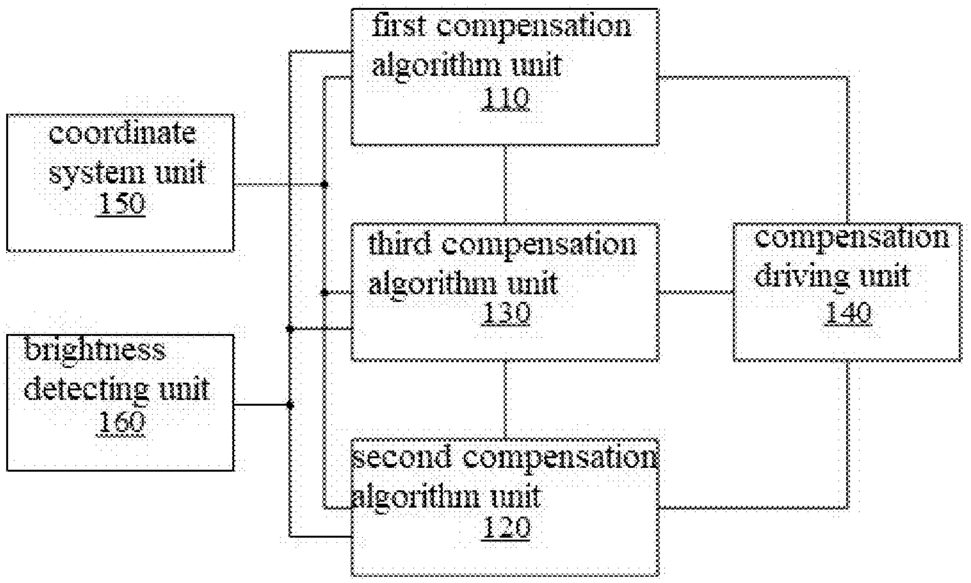
FIG. 5 is a structural block diagram of a gray scale compensation apparatus for a display panel according to an embodiment of the present application.

With reference to FIG. 5, an embodiment of the present application further provides a gray scale compensation apparatus for a display panel, and the apparatus is used for gray scale compensation for the display panel. The display panel includes a first display region, a second display region, and a transition display region arranged between the first display region and the second display region. The gray scale compensation apparatus may include a first compensation algorithm unit 110, a second compensation algorithm unit 120, a third compensation algorithm unit 130, and a compensation driving unit 140.

The first compensation algorithm unit 110 is configured to configure a first compensation algorithm for the first display region, so that a first compensation gray scale of the first display region is obtained according to the first compensation algorithm. The second compensation algorithm unit 120 is configured to configure a second compensation algorithm for the second display region, so that a second compensation gray scale of the second display region is obtained according to the second compensation algorithm. The third compensation algorithm unit 130 is configured to configure a third compensation algorithm for the transition display region, so that a third compensation gray scale of the transition display region is obtained according to the third compensation algorithm. The compensation driving unit 140 is configured to configure the display panel to display an image according to the first compensation gray scale, the second compensation gray scale and the third compensation gray scale.

In some embodiments, the gray scale compensation apparatus further includes a coordinate system unit 150 and a brightness detecting unit 160. The coordinate system unit 150 is configured to establish, on the display panel, a coordinate system for pixel points to acquire a coordinate of a pixel point to be compensated. The brightness detection unit 160 can acquire an actual brightness of the pixel point to be compensated. Under this condition, the third compensation algorithm unit 130 can obtain the third compensation gray scale according to the coordinate and the actual brightness of the pixel point to be compensated and the third compensation algorithm. Specifically, in some embodiments, obtaining the third compensation gray scale according to the coordinate and the actual brightness of the pixel point to be compensated and the third compensation algorithm includes: obtaining a first reference gray scale according to the actual brightness of the pixel point to be compensated and the first compensation algorithm; obtaining a second reference gray scale according to the actual brightness of the pixel point to be compensated and the second compensation algorithm; obtaining, according to the coordinate of the pixel point to be compensated, a first weight value corresponding to the first reference gray scale and a second weight value corresponding to the second reference gray scale; and obtaining the third compensation gray scale according to the first reference gray scale, the second reference gray scale, the first weight value and the second weight value.

In the gray scale compensation apparatus for the display panel according to the embodiments of the present application, the first compensation algorithm is configured for the first display region and the second compensation algorithm is configured for the second display region, so that different display regions have independent compensation algorithms and compensation parameters, thereby avoiding a phenomenon of color deviation in some areas of the display panel caused by using a same compensation algorithm for the whole display panel. In the embodiments of the present application, the third compensation algorithm is configured for the transition display region, so that a compensation difference between the first display region and the second display region is reduced, and there is a transition region between the first display region and the second display region under a compensated display effect, thereby improving the display effect of the compensated display panel.

In addition, the embodiments of the present application may provide a computer storage medium to be implemented in combination with the gray scale compensation methods in the embodiments. The computer storage medium has computer program instructions stored thereon. The computer program instructions, when executed by a processor, implement any one of the gray scale compensation methods of the above embodiments.

Those skilled in the art should understand that, the above embodiments are all illustrative rather than restrictive. Different technical features recited in different embodiments can be combined to achieve beneficial effects. Those skilled in the art should be able to understand and implement other modified embodiments of the disclosed embodiments on the basis of studying the drawings, the description, and claims.

What is claimed is:

1. A gray scale compensation method for a display panel, comprising:

establishing, on the display panel, a coordinate system for pixel points;

dividing a display region of the display panel into a first display region, a second display region and a transition display region arranged between the first display region and the second display region;

wherein the first display region is a rectangular shape, the transition display region is a rectangular ring shape and surrounds an outer periphery of the first display region, and the second display region surrounds an outer periphery of the transition display region;

wherein the coordinate system comprises a first coordinate axis and a second coordinate axis perpendicular to each other, the first coordinate axis is parallel to one pair of sides of the first display region, the second coordinate axis is parallel to the other pair of sides of the first display region, and the transition display region comprises a plurality of sub-transition regions each being a rectangular shape;

configuring a first compensation algorithm for the first display region, so that a first compensation gray scale of the first display region is obtained according to the first compensation algorithm and a first weight value, configuring, for the second display region, a second compensation algorithm different from the first compensation algorithm and a second weight value, so that a second compensation gray scale of the second display region is obtained according to the second compensation algorithm, and configuring, for the transition display region, a third compensation algorithm different from the first compensation algorithm and the second compensation algorithm, so that a third compensation gray scale of the transition display region is obtained according to the third compensation algorithm;

acquiring a coordinate using the coordinate system and an actual brightness of a pixel point to be compensated, wherein the third compensation algorithm is based on the pixel point;

obtaining the third compensation gray scale according to the coordinate and the actual brightness of the pixel point to be compensated and the third compensation algorithm;

wherein obtaining the third compensation gray scale according to the coordinate and the actual brightness of the pixel point to be compensated and the third compensation algorithm comprises:

obtaining a first reference gray scale according to the actual brightness of the pixel point to be compensated and the first compensation algorithm;

obtaining a second reference gray scale according to the actual brightness of the pixel point to be compensated and the second compensation algorithm;

obtaining, according to the coordinate of the pixel point to be compensated, the first weight value corresponding to the first reference gray scale and the second weight value corresponding to the second reference gray scale; and obtaining the third compensation gray scale according to the first reference gray scale, the second reference gray scale, the first weight value and the second weight value;

wherein the plurality of sub-transition regions comprise a second sub-transition region comprising opposite first vertex and second vertex, the first vertex coincides with one of vertices of the first display region, and the second vertex is one of vertices of the transition display region, in the second sub-transition region, obtaining, according to the coordinate of the pixel point to be compensated, the first weight value corresponding to the first reference gray scale and the second weight value corresponding to the second reference gray scale comprises:

obtaining the first weight value according to the formula below:

$$k1=\sqrt{((b2-y1)/(n1-y1))^2+((a2-x1)/(m1-x1))^2},$$

correcting k1 to be equal to 1 under a condition that k1>1, wherein k1 is the first weight value; b2 is a coordinate value of the pixel point to be compensated on the first coordinate axis; a2 is a coordinate value of the pixel point to be compensated on the second coordinate axis; n1 is a coordinate value of the first vertex on the first coordinate axis; m1 is a coordinate value of the first vertex on the second coordinate axis; y1 is a coordinate value of the second vertex on the first coordinate axis; and x1 is a coordinate value of the second vertex on the second coordinate axis, and obtaining the second weight value according to the formula below:

$$k2=1-k1,$$

wherein k2 is the second weight value; and configuring the display panel to display an image according to the first compensation gray scale, the second compensation gray scale and the third compensation gray scale.

2. The gray scale compensation method for the display panel according to claim 1, wherein obtaining the third compensation gray scale according to the first reference gray scale, the second reference gray scale, the first weight value and the second weight value comprises obtaining the third compensation gray scale according to the formula below:

$$Nc=N_{x1}\times k1+N_{x2}\times k2,$$

wherein Nc is the third compensation gray scale; $N_{x1}$ is the first reference gray scale; $N_{x2}$ is the second reference gray scale; k1 is the first weight value; and k2 is the second weight value.

3. The gray scale compensation method for the display panel according to claim 1, wherein the first weight value is negatively correlated with a distance between the pixel point to be compensated and the first display region, and the second weight value is negatively correlated with a distance between the pixel point to be compensated and the second display region.

4. The gray scale compensation method for the display panel according to claim 1, obtaining the first reference gray scale according to the actual brightness of the pixel point to be compensated and the first compensation algorithm comprises obtaining the first reference gray scale according to the formula below:

$$N_{x1}=N1\times(L_{aver1}/\mathrm{Ln})^{1/Gamma1},$$

wherein $N_{x1}$ is the first reference gray scale; N1 is, under the first compensation algorithm, a pre-compensation displaying gray scale for the pixel point to be compensated; $L_{aver1}$ is, under the first compensation algorithm, a target compensation brightness of the pixel point to be compensated; Ln is the actual brightness of the pixel point to be compensated; Gamma1 is a gray scale coefficient under the first compensation algorithm, obtaining the first reference gray scale according to the coordinate and the actual brightness of the pixel point to be compensated and the first compensation algorithm comprises:

obtaining the first reference gray scale according to the formula below:

$$N_{x2}=N2\times(L_{aver2}/\mathrm{Ln})^{1/Gamma2},$$

wherein $N_{x2}$ is the second reference gray scale; N2 is, under the second compensation algorithm, a pre-compensation displaying gray scale for the pixel point to be compensated; $L_{aver2}$ is, under the second compensation algorithm, a target compensation brightness of the pixel point to be compensated; Ln is the actual brightness of the pixel point to be compensated; Gamma2 is a gray scale coefficient under the second compensation algorithm.

5. The gray scale compensation method for the display panel according to claim 4, wherein N1=N2 and Gamma1=Gamma2, obtaining the third compensation gray scale according to the first reference gray scale, the second reference gray scale, the first weight value and the second weight value comprises:

obtaining the third compensation gray scale according to the formula below:

$$Nc=N1\times((L_{aver1}\times k1+L_{aver2}\times k2)/\mathrm{Ln})^{1/Gamma1},$$

wherein Nc is the third compensation gray scale.

6. The gray scale compensation method for the display panel according to claim 4, wherein N1=N2 and $L_{aver1}=L_{aver2}$, obtaining the third compensation gray scale according to the first reference gray scale, the second reference gray scale, the first weight value and the second weight value comprises:

obtaining the third compensation gray scale according to the formula below:

$$Nc=N1\times(L_{aver1}/\mathrm{Ln})^{1/(Gamma1\times k1+Gamma2\times k2)},$$

wherein Nc is the third compensation gray scale.

7. A gray scale compensation apparatus for a display panel, with a processor configured to perform gray scale compensation for the display panel, wherein the display panel comprises a first display region, a second display region and a transition display region arranged between the first display region and the second display region, and the gray scale compensation apparatus for the display panel comprises:

the processor performing a first compensation algorithm for the first display region, so that a first compensation gray scale of the first display region is obtained according to the first compensation algorithm and a first weight value;

the processor performing a second compensation algorithm for the second display region, so that a second compensation gray scale of the second display region is obtained according to the second compensation algorithm and a second weight value;

wherein the plurality of sub-transition regions comprise a second sub-transition region comprising opposite first vertex and second vertex, the first vertex coincides with one of vertices of the first display region, and the second vertex is one of vertices of the transition display region, in the second sub-transition region, obtaining, according to the coordinate of the pixel point to be compensated, the first weight value corresponding to the first reference gray scale and the second weight value corresponding to the second reference gray scale comprises:

obtaining the first weight value according to the formula below:

$$k1=\sqrt{(b2-y1)/(n1-y1))^2+((a2-x1)/(m1-x1))^2},$$

correcting k1 to be equal to 1 under a condition that k1>1, wherein k1 is the first weight value; b2 is a coordinate value of the pixel point to be compensated on the first coordinate axis; a2 is a coordinate value of the pixel point to be compensated on the second coordinate axis; n1 is a coordinate value of the first vertex on the first coordinate axis; m1 is a coordinate value of the first vertex on the second coordinate axis; y1 is a coordinate value of the second vertex on the first coordinate axis; and x1 is a coordinate value of the second vertex on the second coordinate axis, and obtaining the second weight value according to the formula below:

$$k2=1-k1,$$

wherein k2 is the second weight value;

the processor performing a third compensation algorithm for the transition display region, so that a third compensation gray scale of the transition display region is obtained according to the third compensation algorithm;

the processor acquiring a coordinate and an actual brightness of a pixel point to be compensated; wherein the third compensation algorithm is based on the pixel point;

obtaining the third compensation gray scale according to the coordinate and the actual brightness of the pixel point to be compensated and the third compensation algorithm; and the processor configuring the display panel to display an image according to the first compensation gray scale, the second compensation gray scale and the third compensation gray scale.

8. The gray scale compensation apparatus for the display panel according to claim 7, wherein the coordinate system comprises a first coordinate axis and a second coordinate axis perpendicular to each other, the first coordinate axis is parallel to one pair of sides of the first display region, the second coordinate axis is parallel to the other pair of sides of the first display region, and the transition display region comprises a plurality of sub-transition regions each being a rectangular shape.

9. The gray scale compensation apparatus for the display panel according to claim 7, wherein the plurality of sub-transition regions comprise a first sub-transition region located between the first display region and the second display region along a direction parallel to the first coordinate axis, the first sub-transition region comprises opposite first side and second side, the first side coincides with one of sides of the first display region, and the second side coincides with one of sides of the second display region, in the first sub-transition region, obtaining, according to the coordinate of the pixel point to be compensated, the first weight value corresponding to the first reference gray scale and the second weight value corresponding to the second reference gray scale comprises:

obtaining the first weight value according to the formula below:

$$k1=(b1-y1)/(n1-y1),$$

wherein k1 is the first weight value; b1 is a coordinate value of the pixel point to be compensated on the first coordinate axis; n1 is a coordinate value of the first side on the first coordinate axis; y1 is a coordinate value of the second side on the first coordinate axis, and obtaining the second weight value according to the formula below:

$$k2=1-k1,$$

wherein k2 is the second weight value.

* * * * *